United States Patent [19]
Whitney

[11] 3,934,774
[45] Jan. 27, 1976

[54] DUAL SPEED TAPE DRIVE SYSTEM FOR AN ENDLESS LOOP DICTATING AND TRANSCRIBING SYSTEM

[75] Inventor: James C. Whitney, Fairfield, Conn.

[73] Assignee: Dictaphone Corporation, Rye, N.Y.

[22] Filed: Dec. 27, 1974

[21] Appl. No.: 536,856

[52] U.S. Cl. .................. 226/50; 226/178; 226/181
[51] Int. Cl.² ......................................... B65H 17/20
[58] Field of Search .......... 226/49, 50, 51, 37, 178, 226/181, 118, 25; 242/182–185

[56] References Cited
UNITED STATES PATENTS

| | | | |
|---|---|---|---|
| 2,996,229 | 8/1961 | Loewe | 226/50 |
| 3,817,436 | 6/1974 | Matz | 226/25 |

*Primary Examiner*—Richard A. Schacher
*Attorney, Agent, or Firm*—Curtis, Morris & Safford

[57] ABSTRACT

A dual speed tape drive system for a dictating and transcribing system is provided with means for recording and transcribing and including a single-bin, random-wind tape storage magazine to store an endless loop of magnetic tape in random folds. The tape is drawn from the magazine at one side, passed over the top of the apparatus, back into the magazine and out of the magazine through a dictate-playback station. After passing through the dictate-playback station the tape is returned to the magazine where it may be stored in random-wound folds until a transcribe station is activated to draw the tape from the magazine through the transcribe station and back into the magazine where it is stored awaiting further dictation. Both the dictate-playback station and the transcribe station are provided with bidirectional tape drive capability and one tape drive system at each station is provided with dual speed tape drive capability to allow for tape drive at normal recording or transcribing speed as well as a fast forward speed.

6 Claims, 6 Drawing Figures

DUAL SPEED TAPE DRIVE SYSTEM FOR AN ENDLESS LOOP DICTATING AND TRANSCRIBING SYSTEM

This invention relates to a tape drive system for a recording and transcribing system and more particularly to a tape drive system with dual speed capability for a recording and transcribing system which utilizes an endless loop of magnetic tape stored in random fashion in a single-bin tape storage magazine.

Recording and transcribing systems utilizing an endless loop of magnetic tape so that both dictation and transcription can be accomplished at the same time have been proposed heretofore. Examples of such prior art recording and transcribing systems are those shown in U.S. Pat. No. 2,988,604 to Nye and U.S. Pat. No. 2,989,594 to McKaig. Each of those units use a double-bin tape storage, the first storage bin to store tape after messages have been recorded thereon and the second storage bin to store tape after the transcriber has listened to the recorded messages. Both of these storage bins must be large enough to accommodate all of the tape as, for example, when the dictator has recorded on the whole length of tape before any of it has been transcribed, or when all of the tape has been passed through the transcribed unit without any recording taking place. Hence, with such an arrangement, it is necessary to have two storage bins each large enough to accommodate the complete length of tape to be used. U.S. Pat. No. 3,596,818 to Curtis et al. and U.S. Pat. No. 3,817,436 to Matz et al. disclose endless loop single-bin recording and transcribing systems which obviate many of the problems associated with a double-bin system. However, none of these prior art references disclose an endless tape loop dictating and transcribing system with dual drive speed capability. The present invention incorporates an improved tape drive system to provide dual speed tape drive capability to permit tape drive at standard recording or transcribing speed as well as tape drive at a fast forward speed.

It is therefore an object of the present invention to provide an improved endless loop magnetic tape dictating and transcribing system wherein the endless loop of tape is random-wound in a single storage bin.

It is a further object of the present invention to provide an improved random-wind, single-bin dictating and transcribing system wherein the tape feed and tape drive systems are improved to lessen tape tension and to provide dual speed tape drive capability at the dictate and transcribe stations in the forward direction.

These and other objects and advantages of the present invention will be more readily apparent after consideration of the following specification taken in conjunction with the accompanying drawing, wherein.

Figure 1:
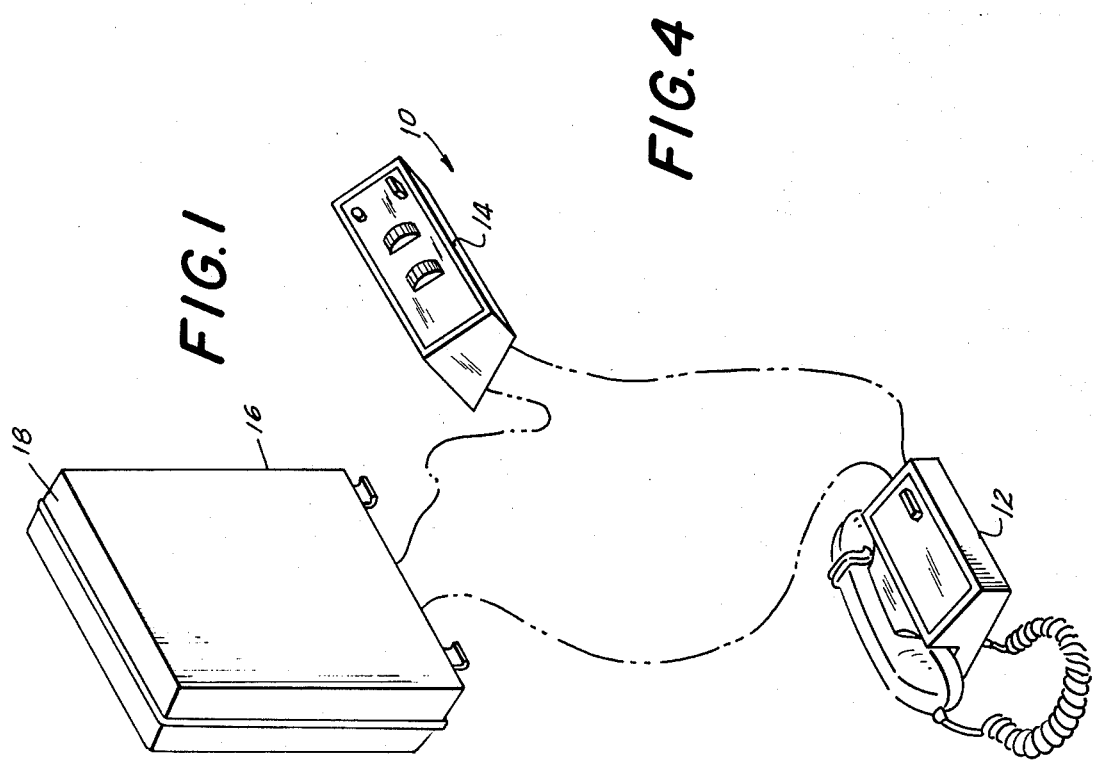
FIG. 1 is a diagrammatic representational view showing a complete dictating and transcribing system.

With reference to the drawing and particularly FIG. 1, a dictating and transcribing system 10 is shown diagrammatically which includes a dictating station 12 and a transcribing station 14 connected to a dictation, transcribe and tape storage apparatus 16.

Figure 4:
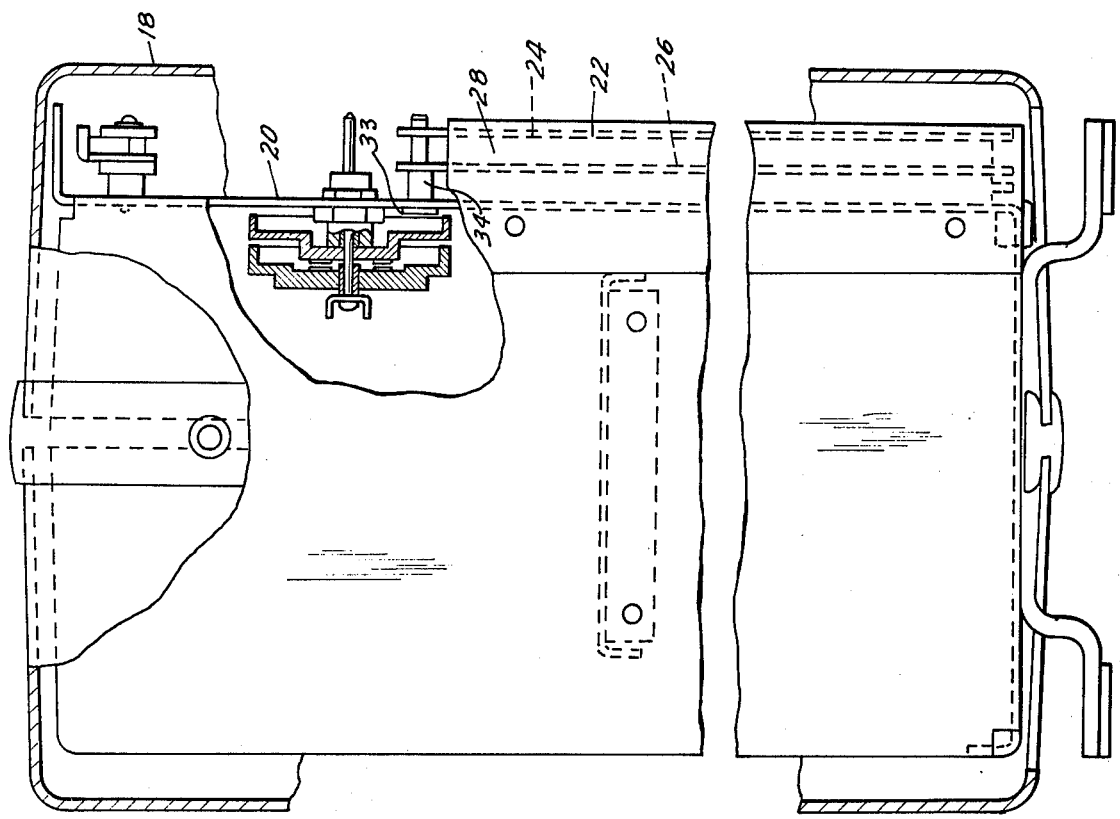
FIG. 4 is a side elevational view of the tape drive and tape storage system.
Figure 2:
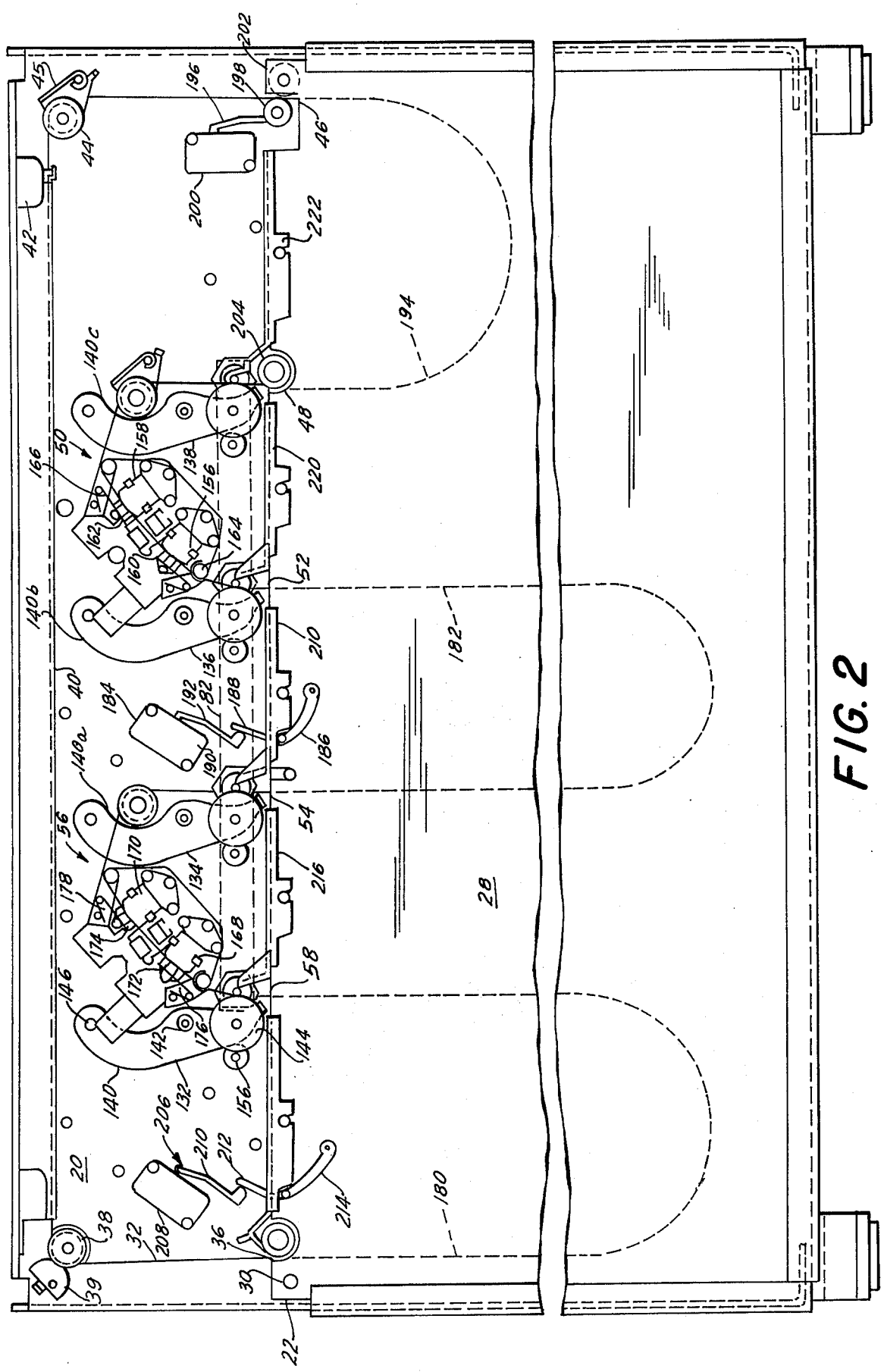
FIG. 2 is an elevational view showing the front of the tape storage and tape drive system of the present invention.
Figure 3:
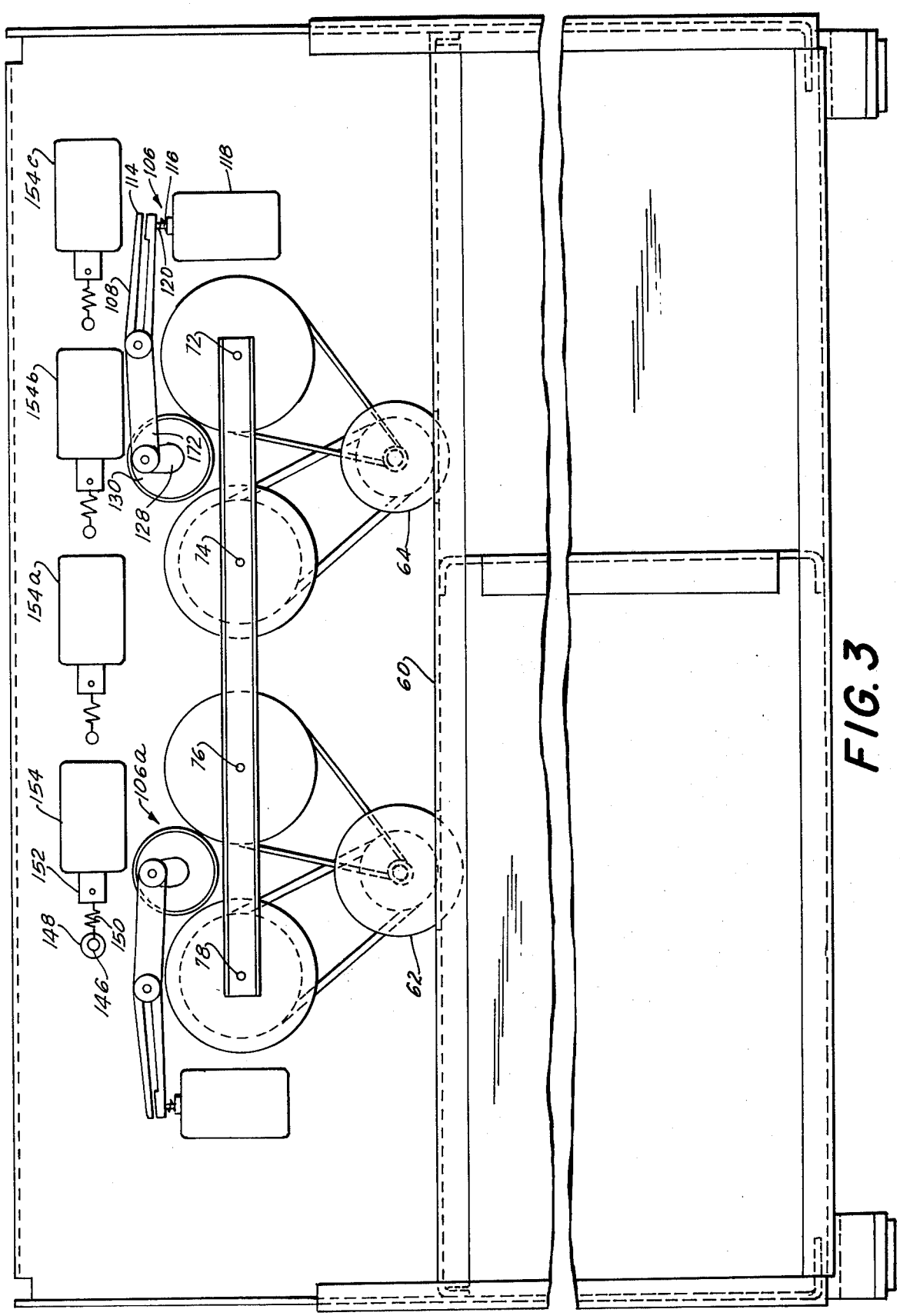
FIG. 3 is an elevational view showing the rear of the tape storage and tape drive system of the present invention.

With reference now to FIGS. 2, 3 and 4 as well, the dictate-transcribe system 16 includes a housing 18, which is removable for service of the equipment, and a chassis plate 20 within the housing to which the various components of the system are mounted. The components of the system include a tape storage magazine 22 (see FIG. 4) comprising front and rear plate members 24 and 26, respectively, spaced from each other by peripheral spacer bars 30 to define a tape storage cavity 28 therebetween. The panels 24 and 26 are spaced from each other a distance which is slightly greater than the width of the magnetic tape utilized in the apparatus. The tape 32 is preferably a magnetic tape suitable for recording which is in the form of an endless loop of a sufficient length to provide, for example, 3 hours of continuous dictation and the tape accumulates in random loops within the tape storage magazine. Because the spacing between panels 24 and 26 is slightly wider than the width of the tape, no tangling or snarling of the tape occurs.

The tape magazine 22 is mounted to the chassis plate 20, for example, by suitable bolts 33 and spacer nuts 34, and the tape 32 is fed out of the magazine through a tape opening 36 in the upper left portion of the magazine 22, as viewed in FIG. 2, over a rotatably mounted roller member 38 extending from the chassis plate 20, where the tape is held to the roller 38 by a pawl assembly 39, along a horizontally disposed guide track 40, which is provided with a pressure pad assembly 42 at one end, over another rotatably mounted roller member 44, where the tape is held to the roller 38 by a guide post assembly 45, and back into the magazine 22 through a tape receiving opening 46 in the upper right corner of the magazine. The tape is drawn out of the magazine 22 through a tape opening 48, threaded through a dictate-playback station 50 to return to the magazine through a tape opening 52 and out of the magazine through a tape opening 54 to be threaded through a transcribe station 56 and returned to the magazine through a tape opening 58. With this construction provision is made to store the tape 32 in three discreet loops within the magazine 22, as will be explained more fully hereinbelow.

Dictating and transcribing equipment must have certain inherent capabilities in order to be acceptable for the intended use of providing a means for a dictator to record a transcription, permit backspacing and playback so the dictator can review the transcription and also permit a transcriptionist to listen to the dictated material and allow the transcriptionist to play back the material if necessary. Hence, the equipment must have bidirectional drive capabilities at both the dictating station and the transcription station. Accordingly, the apparatus of the present invention is provided with bidirectional drive capability at both the dictating station 50 and the transcribing station 56. The drive of the tape through the apparatus is accomplished through a rotating capstan against which a pinch roller or pressure roller presses the tape. In addition, it is desirable to provide tape drive capability in a fast forward mode at both the dictating station 50 and the transcribing station 56 to enable the dictator and transcriptionist to drive tape in a forward direction at a fast speed, for example after previously recorded tape has been reviewed.

Figure 5:
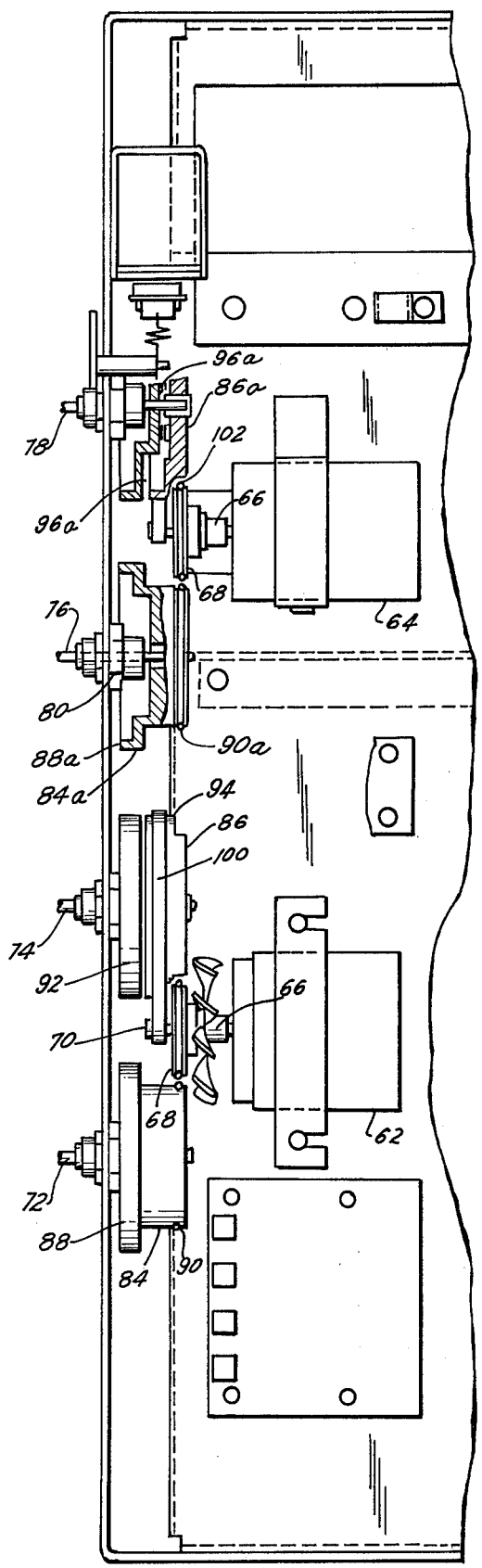
FIG. 5 is a top plan view of the tape drive and tape storage system.
Figure 6:
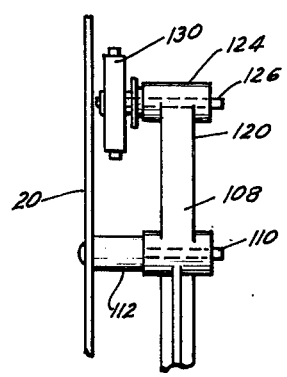
FIG. 6 is a partial plan view showing the mounting for the idler wheel of a typical tape drive unit.

As best seen in FIG. 3, the chassis plate 20 includes an extending plate 60 upon which is mounted a pair of identical motors 62 and 64, respectively. The output shaft 66 of each motor (see FIG. 5) includes a grooved hub 68 secured thereon and a grooved end segment 70 to receive a drive belt to drive the tape drive capstans. Four driven capstans 72, 74, 76 and 78, respectively, are provided which are driven by the motors 62 and 64. The capstan assemblies are identical for capstans 72 and 76, and for capstans 74 and 78, and hence a description of one of the capstan assemblies will suffice. Each of the capstan assemblies include a cylindrical capstan system 72–78 which extends through the chassis plate 30 and is suitably rotatably journaled within the chassis plate by a bushing 80 and within a support bar 82 spaced from, and fixed to, the chassis plate 20 by suitable bolt members (not shown).

Secured to each capstan shaft 72 and 76 is an identical hum member 84 and to capstan shafts 74 and 78 as identical hub assembly 86. The hub 84 is associated with capstan shaft 72 and to differentiate from the other identical hub member the designator 84a is used for the hub associated with shaft 76. In like manner, hub assembly 86 is shown associated with shaft 74 and 86a with shaft 78.

Each hub 84 includes a disc segment 88 adjacent the chassis plate 20 and a grooved disc segment 90 of a lesser diameter more removed from chassis plate 20. Each hub assembly 86 includes a disc segment 92 closest to chassis plate 20 which is directly keyed to its respective capstan shaft 74 or 78 and a disc segment 94 indirectly keyed to the respective capstan shaft 74 or 78 through an overriding clutch mechanism 96.

A drive belt 98 is engaged about grooved hub 68 of motor 62 and about grooved hub 90 of hub 84 to drive capstan 72 while another drive belt 100 is engaged about the grooved segment 70 of the output shaft of motor 62 and about the disc segment 94 to drive capstan 76 through the overriding clutch mechanism 96. In like manner, a drive belt 102 is engaged about grooved hub 68 of motor 64 and the grooved hub 90a to drive capstan 76 and a drive belt 104 is engaged about the grooved segment 70 of the drive shaft of motor 64 and the disc segment 94a to drive capstan 70 through the overriding clutch mechanism 96a. Thus, because of the various drive ratios between the output shaft of the motors 62 and 64 and the hubs 88 and 90, capstans 72 and 76 are driven at a lower rate of speed than capstans 74 and 78. Capstans 72 and 76 are associated with the tape drive system to drive the tape in a forward direction at a slower recording and transcribing speed while capstans 74 and 78 are associated with the tape drive system to drive the tape in a reverse or backspace mode and, consequently, drive the tape at a much higher rate of speed.

The unit of the present invention is designed so that when any operation mode is initiated both of the motors 62 and 64 are actuated so that each of the drive capstans 72–78 rotate at all times when the unit is in any operating mode. The particular tape drive for recording, backspace and playback for dictating station 50 and transcription and backspace for transcribe station 56 are selected by engaging one or more of a plurality of pinch rollers against one of the driven capstans.

The fast forward tape driven mode results by utilizing the faster tape drive speed obtainable from the rewind capstans 72 and 76 through the intercession of idler wheel assemblies 106 and 106a (see FIG. 3). Both are identical in construction and operation so that only one will be described, it being understood that like parts in assembly 106a will be designated with the same numeral followed by a.

Idler wheel assembly 106 includes an arm 108 pivotally mounted to chassis plate 20, at 110, by a spacer bushing 112 secured to chassis plate 20 above the capstan shaft 72 and its associated disc segment 88.

One end 114 of arm 108 is secured to the actuating plunger 116 of a solenoid 118 mounted on chassis plate 20. A compression spring 120 is interposed about plunger 116 between the end 114 of arm 108 and the solenoid 118 to bias arm 108. The other end 122 of arm 108 includes a bushing member 124 integrally formed thereon through which is mounted a shaft 126 which is slidably disposed within an elongated slot 128 of an idler wheel 130. Slot 128 is disposed so that when arm 108 is pivoted by the extension of solenoid plunger 116, shaft 126 is moved downwardly, as viewed in FIG. 3, and is positioned in the radial center of idler wheel 130.

This action also moves idler wheel 130 downwardly from a first position out of contact with hubs 88 and 92, shown in solid line in FIG. 3, to a second position in contact with hubs 88 and 92, shown in broken line in FIG. 3. When idler wheel 130 contacts hub 88, it is driven by hub 88 at the fast tape drive speed and this drive motion is translated to hub 92 through the contacting idler wheel 130. Because hub 92 now drives the forward drive tape capstan 74, as this hub is directly keyed to capstan shaft 74, capstan shaft 74 rotates at the fast speed. The overriding clutch assembly 96 comes into play and belt 100 disc segment 94, in essence, free-wheel, while capstan 74 is driven by the fast speed drive system.

Solenoids 118 and 118a are actuated responsive to an appropriate electrical signal through an electrical control circuit (not shown) initiated by either the dictator or the transcriptionist whenever fast forward tape drive is desired.

As best seen in FIG. 2, each of the drive capstans 72–78 has associated therewith a pinch roller assembly 132, 134, 136 and 138, respectively. Each of the pinch roller assemblies 132–138 are identical so that the description of one pinch roller assembly 132 will be made and the like elements in the other pinch roller assemblies will be designated with the same numeral followed by a, b or c, respectively. Pinch roller assembly 132 includes a lever member 140 pivotally secured to the chassis plate 20, as at 142, and is provided with a pinch roller 144 rotatably secured to lever 140 at its lower end. The upper end of lever 140 includes a pin 146 which extends through an oversized aperture 148 in chassis plate 20 where it is engaged by a spring member 150 (see FIG. 3) mounted on the end of a plunger rod 152 of a solenoid 154.

In an unactivated state solenoid 154 has its plunger rod 152 retracted and when it is actuated, by an electrical input from an associated electrical control circuit (not shown), plunger rod 152 extends moving pin 146 with it. Thus, extension of the plunger rod 152 causes lever 140 to pivot about its pivotable mounting 142 and draws the pinch roller 144 toward the associated capstan 72. Tape 32 is disposed between capstan 72 and the pinch roller 144 so that when the pinch roller is brought into abutting relationship with the capstan, the capstan 72 drives the tape. A pin 156 is also provided extending from chassis plate 20 to limit the pivoting motion of the pinch roller 144 and lever 140 when the plunger 152 is retracted after the solenoid 154 is deactivated.

During operation of the apparatus in the dictate or dictator listen mode, solenoid 154b, whether normal forward tape drive or fast forward tape drive are selected, is actuated by an appropriate electrical response from the control electrical circuitry (not shown) so that plunger 152b is extended pivoting lever 140b so that pinch roller 144b contacts the tape 32 and presses it against drive capstan 76 and the tape driven by drive capstan 76 is now pulled through dictate station 50. The dictate station 50 includes transducer heads 156 and 158 for recording and playback with the transducer elements being suitably mounted to the chassis plate 20. Pressure pads 160 and 162 are also mounted to chassis plate 20 and are urged by coil spring members 164 and 166 against the transducer elements 156 and 158 to firmly position the tape 32 on the face of the transducer heads.

In like manner, transcribe station 56 includes transducer heads 168 and 170 and pressure pads 172 and 174 are urged by coil springs 176 and 178 to maintain the tape 32 in firm contact on the face of transducer heads 168 and 170. When a transcriptionist activates the transcribe station 56, solenoid 154 is actuated to extend plunger 152 and pivot lever 140 to bring pinch roller 144 in contact with drive capstan 72 thereby pinching the tape 32 between the pinch roller 144 and the drive capstan 72 to draw the tape through the transcribe station 56. Transcribe station 56 may be actuated at the same time as dictate station 50 so that dictation and transcription may occur at the same time.

As soon as the dictate station 50 is activated, the tape 32 is drawn from the tape magazine 22 through tape opening 36 from an accumulation loop of tape 180, which may be in random-wound folds, and is passed through dictate station 50 and deposited back into the magazine through tape opening 52 to an accumulation loop 182. As long as the transcribe station 56 is not actuated, tape drawn through the dictate station 50 will continue to accumulate in loop 138. As soon as the dictation begins, an appropriate signal at the transcriptionist's instrument indicates to the transcriptionist that material is ready for transcribing and the transcriptionist may begin transcribing the material on tape 32. Thus, the transcribe station 56 may be actuated and draws tape accumulated in loop 182 through tape opening 54 through the transcribe station 56 and deposits the tape back in the magazine 22 through tape opening 58 to accumulation loop 180.

As long as there is sufficient tape in loop 182 to be drawn through transcribe station 56 both the dictate station 50 and the transcribe station 56 may operate at the same time. However, if dictate station 50 should be deactivated, for example when dictation ceases or if the dictate station is activated to a backspace mode, so tape loop 182 becomes taut, then there will be insufficient tape in tape loop 182 to allow transcription and dictation to occur. Thus, a tautness will be sensed in tape loop 182.

Accordingly, a tape tautness assembly 184 is provided which includes a lever member 186 pivotally mounted within magazine 22 at the upper end of the magazine 22 which includes an extending finger 188. A microswitch 190 having a microswitch actuating arm 192 extending therefrom is positioned so that when the tape loop 182 becomes taut, the tape contacts the sensing lever 186 and pivots extending finger 188 into contact with microswitch actuating arm 192. This closes the microswitch 190 to initiate an electrical signal to activate solenoid 154b thereby pivoting pinch roller 144b into contact with drive capstans 76. Thus, both drive capstans 72 and 76 drive tape 32 in a forward direction during periods when tape tautness is sensed by microswitch assembly 140. If the tautness in loop 182 results because the dictate station has been placed in a backspace mode, i.e. where pinch roller 144c is against drive capstan 78, then when microswitch assembly 184 is activated solenoid 154c controlling pinch roller 144c is deactivated and solenoid 154b activated to insure that the tape is driven only in the forward direction.

Tape tautness in tape accumulation loop 182 could also occur if the transcribe station 56 is driving the tape in a forward direction and dictate station 50 is activated by the dictator and placed in a backspace mode. In this occurrence solenoid 154c is activated extending plunger 152c so that lever 140c pivots pinch roller 144c into contact with capstan 78. Capstan 78 drives tape 32 in the reverse direction and would draw tape from accumulation loop 182 up through tape opening 52 and back into the magazine through tape opening 48 to form a tape accumulation loop 194. If tape accumulation loop 182 becomes small enough when dictate station 50 is placed in a backspace mode and microswitch assembly 184 is activated, solenoid 154c will be deactivated thus disengaging the backspace tape drive in the dictate station 50 so that no further reverse movement of the tape could occur.

Accumulation loop 194 is formed only when the dictate station 50 is placed in a backspace mode and this condition occurs most commonly when the dictator backspaces the tape 32 to review a portion of material that he has dictated previously. In the event the dictator backspaces the tape to a significant extent to review a portion of the dictation and subsequently disconnects the dictate station 50, the accumulation loop 194 would remain and if the dictator subsequently activated the dictate station 50 and began dictation immediately, the newer dictated material would be recorded on the tape 32 and the old dictated material erased. To avoid this inadvertent erasure of previously dictated material a furthest advance switch assembly is provided.

The furthest advance switch assembly includes a lever spring 196 upon which is mounted an idler roller 198. A microswitch 200 is associated wit lever spring 196 and is mounted on chassis plate 20. Idler roller 198 is positioned adjacent a roller 202 mounted in tape magazine 20 with the tape 32 interposed between the rollers 198 and 202. During a normal operating mode when dictate station 50 is operating to drive the tape 32 in a forward direction, tape accumulation loop 194 is not formed and the tape follows a path around roller 198 and around a lever spring roller 204 in tape opening 48. The tape is taut and depresses lever spring 146 to close microswitch 200.

When microswitch 200 is maintained closed, an electrical response is intiated to the electrical control circuit (not shown) which controls solenoid 154 and thus the forward drive capstan 76 in dictate station 50 under certain circumstances. If the dictator backspaces the tape to form accumulation loop 194, the tape tautness is relieved and the tension holding lever 196 is removed opening microswitch 200. When microswitch 200 is opened, an electrical signal is initiated so that if the dictator disconnects his dictate instrument 12 from the system while accumulation loop 194 is formed, solenoid 154b is automatically actuated to drive the tape 32 in a forward direction until accumulation loop 194 no longer exists and the tape is pulled taut to close microswitch 200. With the closing of microswitch 200 solenoid 154b is deactivated and the dictate station placed in a neutral ready-to-dictate position. This feature is important to preserve dictation on tape which has been backspaced and to prevent the dictator from inadvertently dictating over and erasing previously dictated material. The return feature to eliminate accumulation loop 194 is only actuated when the dictator disconnects his dictation apparatus from the system and is not actuated when the dictator wishes to dictate over or change previously dictated material.

An additional tape tautness sensing assembly 206 is provided which includes a microswitch 208 having a microswitch actuating arm 210 positioned to be contacted by the extending finger 212 of a pivotally mounted lever 214. Tautness sensing assembly 206 senses tape tautness when accumulation loop 180, which is the loop of tape from which tape to be dictated upon is drawn, is eliminated. This condition occurs if the dictator has dictated continuously for the full length of time of the tape capability in the apparatus without transcription taking place. Thus, if the apparatus is provided with sufficient tape to permit 3 hours of dictation, and the dictator dictates for 3 hours without transcription occurring, tape loop 180 will be eliminated and the tape will be pulled taut pivoting extending finger 212 into contact with the microswitch actuating arm 210. When this condition occurs, solenoid 154b is deactivated precluding further forward drive of the tape through the dictate station 50.

Another advantage of the dictating and transcribing system of the present invention is afforded by the tape drive path wherein the tape is drawn from magazine 22 up over roller 38, along horizontal guide track 40 and over roller 44 to be returned to the magazine. This affords a tape path which lessens tape loop tension thus making the tape easier to drive. Accordingly, the tape drive mechanisms can be lighter and smaller than heretofore achieved.

Additionally, the tape path over the tape drive system permits ready replacement of the tape loop by a factoryspliced continuous tape loop making tape replacement by service personnel relatively simple should tape replacement be necessary. The advantage to this feature is that field spliced tape cannot be accomplished in as satisfactory a manner as a splice placed in the tape during manufacture. Thus, for ease of tape replacement movable cover plates 214, 216, 218, 220 and 222 are provided over the tape openings from tape magazine 22.

To replace a tape loop, cover plates 214–222 are removed, the tape to be replaced is removed and a new tape loop threaded through the fully exposed tape drive assembly, with the excess accumulation loops being readily inserted in magazine 22 through the tape openings.

In addition the tape path arrangement allows a great simplification in the construction of the tape storage magazine 22. Because all drive segments are above the magazine and the tape is drawn over the top of the tape drive units, the magazine need only be of a simple construction without extensive idler rollers and tape guides within.

Also the two-motor drive system and the preferred utilization of identical parts have the advantage that varying loads in the dictate and transcribe stations do not effect each other. Thus, speed variations are mechanically isolated. Direct belting from the motor shaft to the forward play drive capstans eliminates the necessity for intermediate step-down pulley mechanisms. Additionally, the belting arrangement provides for speed control between forward reverse play and the fast forward play modes using only two motors rather than the four motors employed in prior art devices.

While the present invention has been described as utilizing two identical synchronous motors it is to be expressly understood that the motor for the transcribe station could be provided with speed control capability to afford the transcriptionist the ability to slow the tape speed down whenever desired, for example if a dictator spoke too rapidly.

It is thus seen that the dictating and transcribing system of the present invention provides a system which minimizes tape loop tension to enable the use of smaller and lighter tape drive assemblies. Because the tape magazine stores the tape in loose random-wound folds, very little resistance to tape movement is imparted to the tape in the tape storage magazine. Thus, the tape path above the dictate and transcribe stations minimizes tape tension significantly. Further the system includes tape tautness sensing mechanisms which disconnect the tape drive through the dictate station when a tautness in the tape is detected.

The system also provides dual forward tape speed drive capability by coupling a fast forward drive through an overriding clutch assembly to the fast speed tape reverse tape drive.

Additionally, the system provides a furthest advance sensing mechanism to advance any tape which has been previously backspaced through the dictate station for review and which has not been advanced when the dictator ceases dictation and disconnects the dictating instrument from the system.

What is claimed is:

1. A bidirectional tape drive assembly including provision for dual speed tape drive in one direction for a dictating and transcribing system utilizing an endless loop of magnetic tape of substantial length comprising:
   a motor including an output shaft,
   said output shaft having first and second drive belt engaging means thereon,
   said first belt engaging means having an effective diameter significantly greater than said second belt engaging means,
   first and second tape drive capstans spaced from each other and adapted to engage said magnetic tape and drive said tape,
   said first capstan including drive belt engaging means operatively associated therewith, a first drive belt operatively disposed about said first belt engaging means on said motor output shaft and said drive belt engaging means on said first capstan thereby to rotate said first capstan when said motor output shaft rotates, said second capstan including a first hub member operatively associated with said second capstan through an overriding clutch means, a second drive belt operatively disposed about said second belt engaging means on said motor output shaft and said first hub member thereby to rotate said second capstan at a slower speed than said first capstan when said motor output shaft rotates, said second capstan including a second hub member spaced from said first hub and overriding clutch member and keyed to said second capstan, and an idler wheel member disposed between said second hub member on said second capstan and said drive belt engaging means on said first capstan and movable from a first position spaced from said second hub member and said first capstan drive belt engaging means and a second position in frictional contact with said second hub member and said first capstan drive belt engaging means thereby to impart the faster speed of rotation of said first capstan to said second capstan.

2. A tape drive assembly as defined in claim 1 wherein said first and second tape drive capstans are spaced from each other having their longitudinal axes substantially parallel to each other and parallel to the output shaft of said motor.

3. A tape drive assembly as defined in claim 2 wherein said idler wheel is rotatably mounted on one end of a lever arm member, the other end of said lever arm member operatively associated with means to move said lever arm end thereby to move said idler wheel from said first position to said second position.

4. A tape drive assembly as defined in claim 3 wherein said means to move said lever arm end comprises a solenoid member having its plunger member operatively engaged with said lever arm end.

5. A tape drive assembly as defined in claim 1 wherein said first and second capstans each have a pinch roller member associated therewith to press said magnetic tape against said capstans, each said pinch roller member being movable from a first position spaced from said capstan and out of contact with said tape to a second position in contact with said capstan thereby to drive said tape when said capstan is rotated.

6. A tape drive assembly as defined in claim 1 wherein said first and second tape drive capstans are spaced from each other having their longitudinal axes substantially parallel to each other and parallel to the output shaft of said motor and disposed on opposite sides of a plane passing through the longitudinal axis of said motor output shaft thereby to rotate in opposite directions.

* * * * *